H. W. KIRCHNER.
SYSTEM OF TRANSPORTATION.
APPLICATION FILED DEC. 15, 1920.

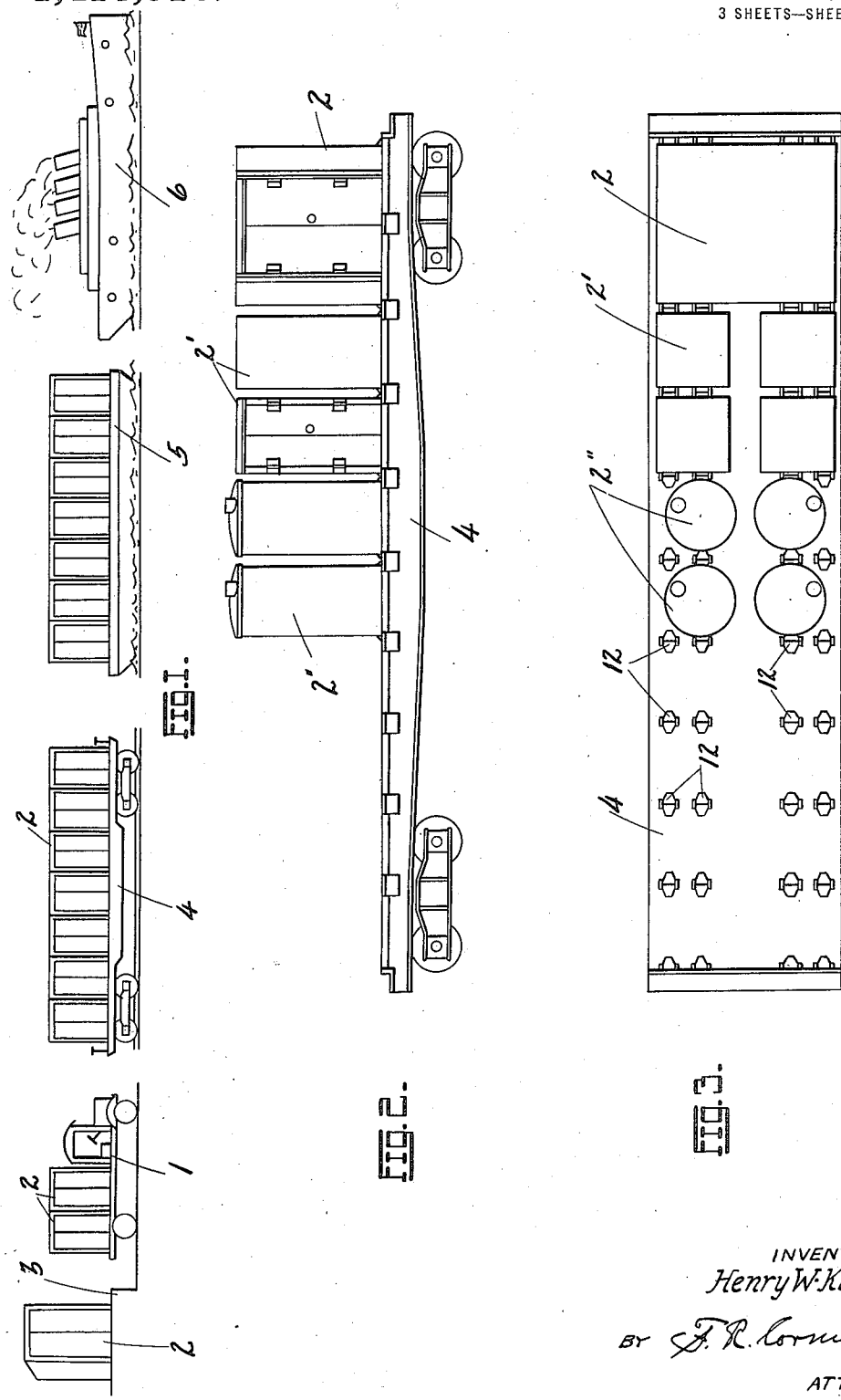

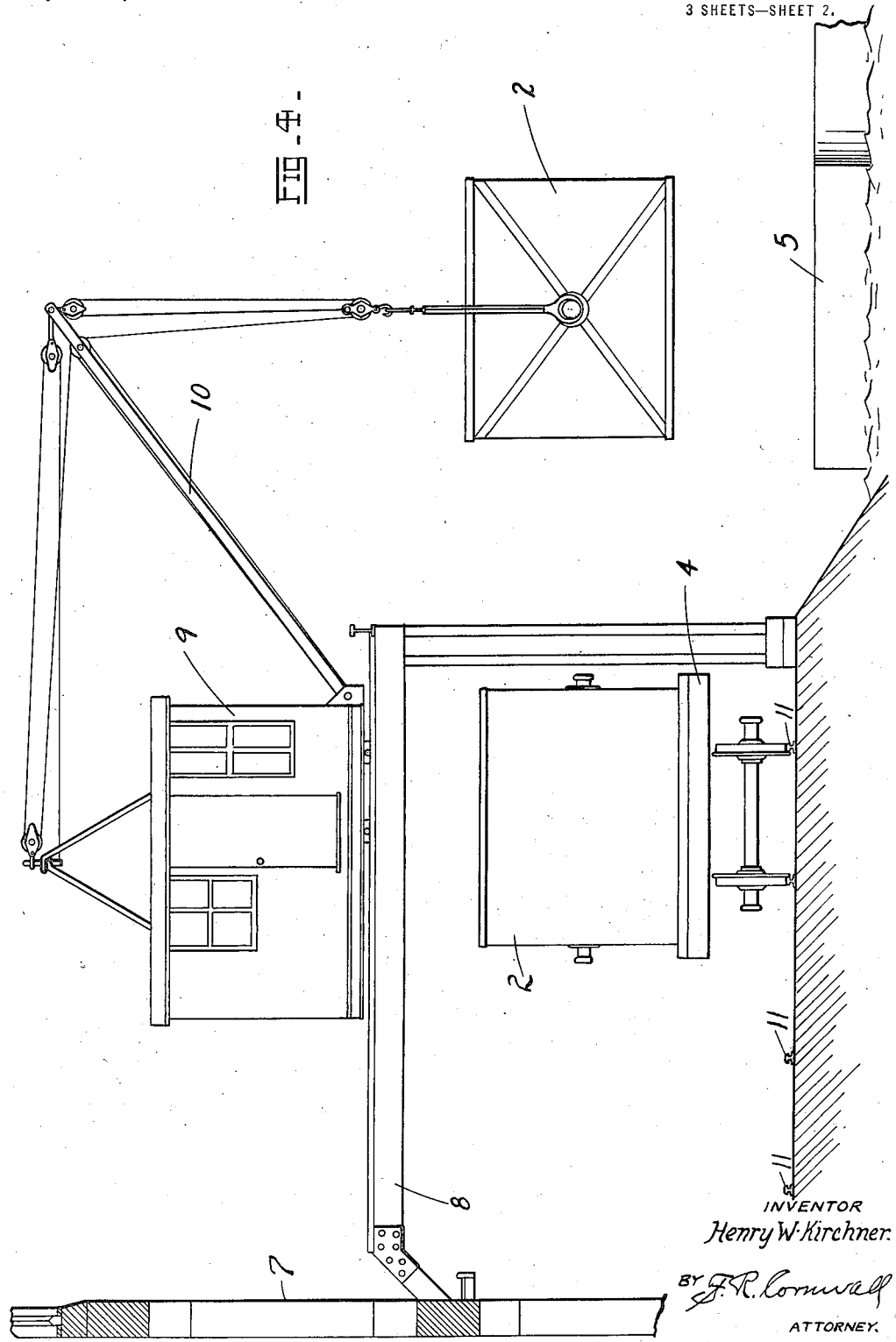

1,414,516.

Patented May 2, 1922.
3 SHEETS—SHEET 3.

INVENTOR.
Henry W. Kirchner.
BY F. R. Cornwall
ATTORNEY.

UNITED STATES PATENT OFFICE.

HENRY W. KIRCHNER, OF ST. LOUIS, MISSOURI.

SYSTEM OF TRANSPORTATION.

1,414,516.  Specification of Letters Patent.  Patented May 2, 1922.

Application filed December 15, 1920. Serial No. 430,902.

*To all whom it may concern:*

Be it known that I, HENRY W. KIRCHNER, a citizen of the United States, residing at St. Louis, State of Missouri, have invented a certain new and useful Improvement in Systems of Transportation, of which the following is a full, clear, and exact description, such as will enable others skilled in the art to which it appertains to make and use the same, reference being had to the accompanying drawings, forming part of this specification.

My invention has relation to improvements in transportation systems and is intended primarily to provide a system of transportation, wherein the carriers, as they are known today, will be dispensed with and in lieu thereof there will be provided various carriers such as trucks, flat cars, barges, and the like, said carriers being devoid of bodies, said bodies being replaced by interchangeable unit containers.

It is a matter of common knowledge that the system of railway transportation of to-day has practically reached the stage where further development along existing lines is impossible. This is especially true because the railway carriers, as a rule, are provided with fixed bodies such as the gondola, boxcar, refrigerator-car, tank-car, and the like. Owing to the fact that loading and unloading is not promptly done, the cars will stand on sidings or at terminals for long periods of time. This greatly decreases the efficiency of the railroads in that there is a large amount of rolling stock not in use. Statistics show us that the waste of time when cars remain stationary at terminals for purposes of loading, unloading, or awaiting time when these operations can be performed, amounts to 68.39 per cent. Freight rolls in trains 9.3 per cent of the time and averages 11.29 per cent in loading and a like amount of time in unloading. This waste of time cannot be overcome no matter how efficient the loading or unloading or how promptly this is attended to, as long as the cars are loaded as a whole with various commodities.

In my improved system of transportation, I intend to overcome the disadvantages above enumerated by providing unit containers that are adapted to be positioned on any type of carrier and suitably secured thereon, these containers being bodily removed from the carrier at point of destination. In this way it is apparent that the carrier itself will not be detained at terminals or en route for purposes of loading or unloading but will spend practically all of their time in transit. As soon as containers are removed from the carrier at one station, the space on the carrier thereby afforded will be occupied by other containers having their origin at said station.

As applied to the railroads, my system means that there will be but one type of carrier and that being the flat car. Obviously, the containers themselves need not be of one type, but said containers may be made so as to meet with requirements for shipping grain, parcel freight, or liquids.

Referring to the drawings—

Figure 1 represents a pictorial view of a series of carriers, namely, a truck 1 which is adapted to be loaded with containers 2 from a platform 3 for conveyance to the flat car 4. The flat car conveys the containers 2 to a river terminal (shown in Figure 4) where the containers will be loaded on a barge 5 to be transported to the point of destination or to a seaport, as the case may be, at which latter place they may be loaded onto an ocean-going liner 6 for export. It will be understood that Figure 1 shows a logical succession of carriers that may be employed in my improved system, although the advantages of the system are equally pronounced though a single carrier be used or any two of the carriers shown in said figure.

Figures 2 and 3 show a side elevation and plan view, respectively, of a flat car on which is mounted a number of containers of various types, all of said containers, however, being adapted for arrangement in one manner or another on a standardized car.

Figure 4 is a side elevation of a conventional levee front provided with a terminal and facilities for loading and unloading the containers on or from a flat car or barge.

Figure 5:
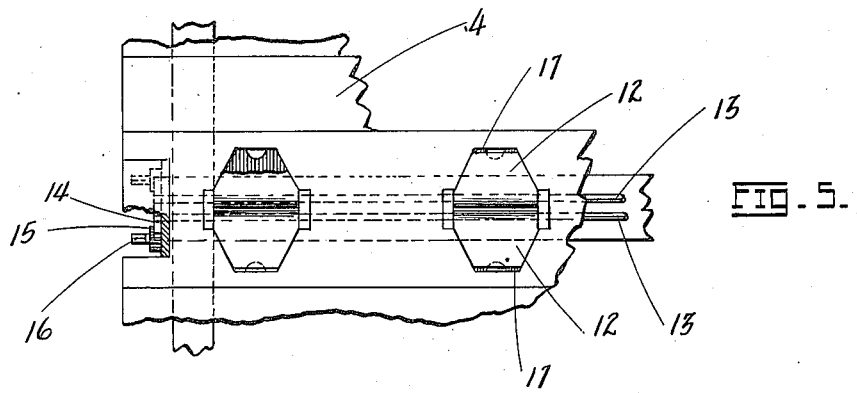
Figure 6:
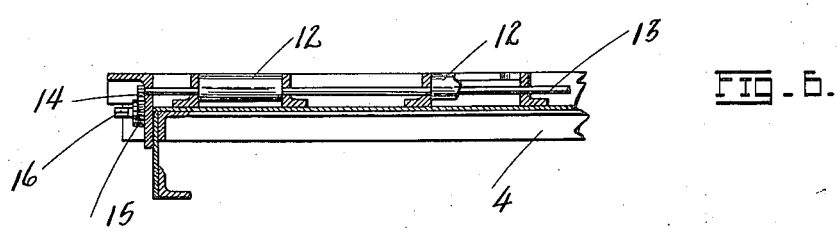
Figure 7:
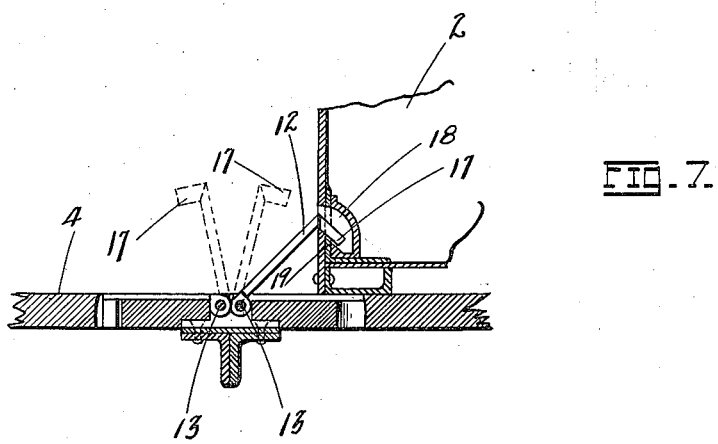
Figure 8:
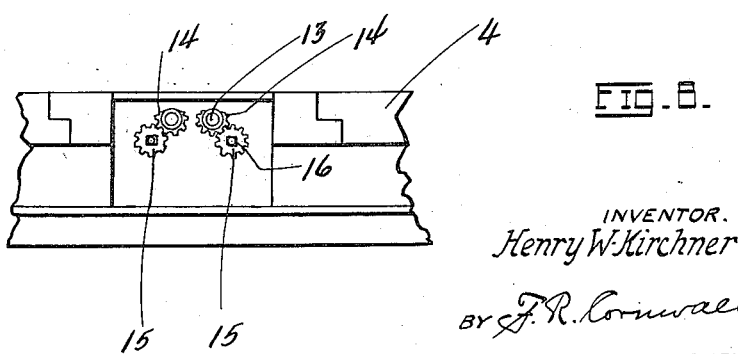

Figures 5 to 8 inclusive, are detail views of the securing means whereby the containers are fixed to the carriers, said securing means being explained in detail and constituting part of the subject-matter of my co-pending application, Serial Number 359,071, filed February 16, 1920.

The advantages of my improved system will be better apparent from a detail description of the system and the manner in which the same may be effectively practiced.

We will assume that the container 2 on the platform 3 (Figure 1) is to be shipped to its point of destination via rail, the railway loading terminal, however, being located some distance from the station 3. In order to convey the containers 2 to the loading station, the truck 1 is employed, the containers 2 after being positioned on the truck preferably being secured thereon by means of complementary fastening devices on the container and truck body, which fastening devices may take any form, but preferably being of the type shown in Figures 5 to 8. Upon reaching the railroad loading terminal, the containers 2 are hoisted from the truck by a crane or derrick (a gantry crane suitable for this purpose being shown in Figure 4), and placed upon the railroad flat car, said containers being secured to the platform of said flat car in the same manner as they were secured to the truck, since the flat car is also provided with fastening devices of the same type as those on the truck. The containers on reaching their destination will be unloaded from the flat car 4 in any manner desired, but preferably by means of a crane, such as shown in Figure 4.

In order to obtain the greatest advantage from my improved system, terminals 7 should be provided at the points where the containers will be transferred from one carrier to another, said terminals being of the construction and arrangement that will facilitate handling of the containers therein.

It is not the purpose of the present application to claim any particular kind of terminal as I shall file at a later date an application for patent on an improved terminal.

Extending outwardly from the terminal 7 and in the present instance projecting right up to the river bank is a gantry 8 on which is mounted a traveling crane 9 provided with a boom 10. The gantry 8 spans a series of railroad tracks 11 above which the crane 9, together with its boom 10, are adapted to travel. A barge 5 is shown in the river positioned next to the gantry and a container 2 is shown being lifted from the barge by means of the crane and about to be positioned on the flat car 4 next to a container that has been previously placed on the car.

It is apparent from the above that the containers, which have within them the material that is shipped, may be easily and quickly moved from carrier to carrier, whether it be from a barge to a flat car or from a car to a truck.

While I have shown a gantry crane as being the medium through which the containers are loaded and unloaded, I do not wish to be restricted to this particular medium as it is within the scope of my invention to provide any suitable means adapted to this purpose.

The fastening or securing means whereby the containers are locked on the carriers consists of pairs of hooks 12 mounted on shafts 13, the ends of which shafts are provided with gear segments 14 adapted to mesh with pinions 15. The pinions 15 are provided with hubs 16 over which a wrench may be placed for the purpose of manipulating the hoods 12. As explained in the aforesaid application, the hooks 12 will be raised as shown in the dotted position, Figure 7, before the containers 2 are positioned on the carrier and when the containers 2 are positioned, the hooks will be lowered so that their terminal fingers 17 will enter pockets 18 in the side walls of the containers, said fingers 17 engaging the upwardly projecting lip 19 of each pocket.

While the securing devices just described have been found satisfactory, I need not restrict myself to this particular type, as any kind of securing means may be employed that will hold the containers to the carrier. However, my invention contemplates that whatever type of securing means are adapted for a particular system shall be uniform throughout the system, thereby permitting any containers to be secured on any carriers in the system, thus making the carriers and containers universal in their application.

The securing devices 12 are shown in Figure 3 distributed over the entire length of the car and normally positioned below the upper surface of the platform, by which arrangement containers 2 of varying sizes may be provided such as the smaller containers 2' and the oil tanks 2''. By virtue of this distribution of the securing devices throughout practically the entire extent of the platform of the carrier body, I am enabled to assemble on said platform containers of various sizes to provide for the shipment of freight in lots of various amounts and I am furthermore enabled to equip a flat car with different types and shapes of containers.

Thus it will be seen that my improved system embracing as it does interchangeable unit containers adapted to cooperate with but a single carrier body, provides a boxcar, tank-car, or any other kind of car by the mere application of the type of container desired to the underframe. Likewise by utilizing containers of different sizes, I can provide containers for all purposes, all of said containers possessing the attributes of universality and interchangeability.

In addition to the above, these various units may be intermingled on a single underframe providing a car adapted to shipping mixed lots of goods or commodities such as oil and grain at the same time. This system of transportation furthermore provides for the shipment of freight in various lots assembled as units at the point of origin, said freight being transported from origin to destination via carriers equipped for universal interchange.

I do not claim in this application the flush or "disappearing" fastening devices of the carrier as the same forms the subject-matter of an application filed by me May 10, 1921, Serial No. 468,396; nor do I claim in this application fastening devices on the carrier and co-operating with the keeper or keepers within the marginal edges of a container, as the same forms the subject-matter of an application filed by me on May 10, 1921, serially numbered 468,397.

I claim:

1. A system of transportation comprising a succession of carriers of different kinds, and containers of different kinds and types of a given size or multiples thereof, adapted to receive various kinds of freight, either liquid, solid, granular, etc., all of said containers of whatever size having fastening means for universal cooperation with substantially identical complementary fastening means on said carriers.

2. A carrier, containers of different kinds and types of a given unit size or a multiple thereof adapted to receive various kinds of freight, either liquid, solid, granular, etc., said carrier having plural groups of fastening means, said container of a unit size or multiple thereof having complementary fastening means designed to cooperate with the fastening means on the carrier in one or more groups thereof.

3. A plurality of carriers of different kinds each having substantially identical securing means arranged in groups, a container of a unit size or a multiple thereof, said container having complementary securing means adapted to cooperate with the securing means on a carrier in one or more groups thereof.

4. A system of transportation comprising a series of carriers adapted to receive a plurality of containers of a unit size or a multiple thereof, terminals, lifting devices at terminals for removing the containers from the carriers, said terminals providing for the universal interchange of the containers of unit size or a multiple thereof on the carriers from point of origin to destination.

5. The combination of a carrier, fastening devices, and containers in the form of units and a multiple thereof designed to be supported by said carrier and to interchangeably co-operate with said fastening devices.

In testimony whereof I hereunto affix my signature this 6th day of December, 1920.

HENRY W. KIRCHNER.